3,205,241
WATER INSOLUBLE ANTHRAQUINONE DERIVATIVES CONTAINING THE —OSO₂R GROUP IN WHICH R IS LOWER ALKYL
David Crawford Eaton and James Wardleworth, Manchester, England, assignors to Imperial Chemical Industries Limited, Millbank, London, England, a corporation of Great Britain
No Drawing. Filed May 28, 1963, Ser. No. 283,703
Claims priority, application Great Britain, Oct. 29, 1958, 34,642/58
6 Claims. (Cl. 260—374)

This application is a continuation-in-part application of our application Serial No. 848,496 which was filed, in the United States Patent Office on October 26, 1959, now abandoned.

This invention relates to new anthraquinone dyestuffs and more particularly it relates to new water-insoluble anthraquinone dyestuffs which are valuable for the colouration of artificial textile materials.

According to the invention there are provided the water-insoluble anthraquinone dyestuffs of the formula:

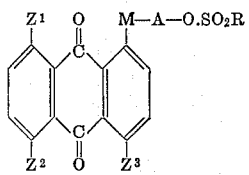

wherein R represents a lower alkyl radical;

A represents a divalent radical selected from the class consisting of ethylene, trimethylene and β-hydroxytrimethylene radicals;

M represents a divalent linking group selected from the class consisting of —NH—, —NHCH₂CH₂O—, —NHCH₂CH₂CH₂O—,

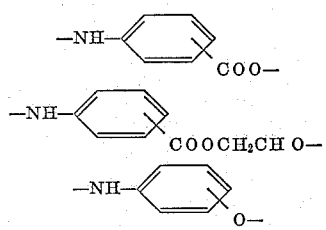

and

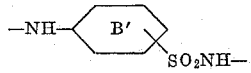

and any substitutents on the benzene ring B' are methyl groups;

Two of $Z^1$, $Z^2$ and $Z^3$ represent hydrogen atoms and the third of $Z^1$, $Z^2$ and $Z^3$ is selected from the class consisting of hydrogen, amino, hydroxy, lower alkylamino, cyclohexylamino and phenylamino, and any substituents on said phenyl radical are selected from the class consisting of lower alkyl and lower alkoxy;

And any further substituents on the anthraquinone nucleus are selected from the class consisting of chlorine and bromine atoms.

Throughout this specification the terms "lower alkyl" and "lower alkoxy" are used to denote alkyl and alkoxy radicals respectively of low molecular weight, in particular alkyl and alkoxy radicals containing from 1 to 4 carbon atoms.

The lower alkyl radical represented by R can be an ethyl, propyl or butyl radical, but is preferably the methyl radical.

It is further preferred that $Z^1$ and $Z^2$ each represent hydrogen atoms, so that $Z^3$ is the substituent selected from the class consisting of hydrogen, amino, hydroxy, lower alkylamino, cyclohexylamino and phenylamino and any substituents on said phenyl radical are selected from the class consisting of lower alkyl and lower alkoxy; but $Z^3$ preferably represents an amino or lower alkylamino group. As examples of the said lower alkyl-amino groups there may be mentioned methylamino, ethylamino, n-propylamino, iso-propylamino and n-butylamino groups.

The water-insoluble anthraquinone dyestuffs of the invention can be obtained by treating an anthraquinone compound of the formula:

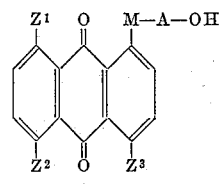

Formula I wherein A, M, $Z^1$, $Z^2$ and $Z^3$ have the meanings stated and any further substituents on the anthraquinone nucleus are selected from chlorine and bromine atoms, with an acid chloride of the formula: R.SO₂Cl, wherein R has the meaning stated.

This reaction may be conveniently brought about by treating a solution of the anthraquinone compound in a basic solvent, for example pyridine, with the acid halide, preferably at a temperature between 0° and 10° C., adding water and filtering off the anthraquinone dyestuff which is precipitated.

As specific examples of the said acid chlorides there may be mentioned methane sulphonyl chloride, ethane sulphonyl chloride and n-propane sulphonyl chloride.

The anthraquinone compounds of Formula I may themselves be obtained by reacting a bromo-anthraquinone of the formula:

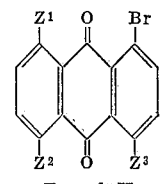

Formula II with a compound of the formula: H—M—A—OH (Formula III); the two reactants preferably being heated together in nitrobenzene medium in the presence of an acid-binding agent such as potassium carbonate or potassium acetate and in the presence of a copper catalyst such as cupric chloride or copper acetate.

As specific examples of the bromo-anthraquinones of Formula II there may be mentioned 1-bromoanthraquinone, 1-anilino-4-bromoanthraquinone, 1-methylamino-4-, 5- or 8-bromoanthraquinone, 1-ethylamino-4-, 5- or 8-bromoanthraquinone, 1-cyclohexylamino-4-bromoanthraquinone, 1-amino-4-, 5- or 8-bromoanthraquinone, 1-hydroxy-4-bromoanthraquinone and 1-isopropylamino-4-bromoanthraquinone.

As specific examples of the compounds of Formula III there may be mentioned β-aminoethanol, γ-amino-n-propanol, γ-amino-α:β-dihydroxy-n-propane, β-(β'-aminoethoxy)ethanol, γ-(β'-aminoethoxy)-n-propanol, β-(γ'-amino-n-propoxy)ethanol, γ-(γ'-amino-n-propoxy)-n-propanol, 2-, 3- or 4-(β-hydroxyethoxy)aniline, 2-, 3- or 4-(β-hydroxyethylcarbonyl)aniline, 2-, 3- or 4-[β-(β'-hydroxyethoxy)ethoxycarbonyl]aniline, 3- or 4-[N-(β-hydroxyethyl)sulphamyl]aniline, 3- or 4-[N-(γ-hydroxypropyl)sulphamyl]aniline, 2-methyl-4-[N-(β-hydroxyethyl)sulphamyl]aniline, 2:4:6-trimethyl-3-[N-(β-hydroxyethyl)sulphamyl]aniline and 2:4-dimethyl-6-[N-(β-hydroxyethyl)sulphamyl]aniline.

As specific examples of the anthraquinone compounds of Formula I which can be used to obtain the water-insoluble anthraquinone dyestuffs of the invention there may be mentioned:

1-(β-hydroxyethylamino)anthraquinone,
1-(γ-hydroxypropylamino)anthraquinone,
1-(β:γ-dihydroxypropylamino)anthraquinone,
1-[3'- or 4'-(β-hydroxyethoxy)anilino]anthraquinone,
1-amino-4-, 5- or 8-(γ-hydroxypropylamino)anthraquinone,
1-methylamino-4-, 5- or 8-(β-hydroxyethylamino)anthraquinone,
1-n-propylamino-4-, 5- or 8-(β-hydroxyethylamino)anthraquinone,
1-iso-propylamino-4-, 5- or 8-[3'- or 4'-(β-hydroxyethoxy)anilino]anthraquinone,
1-iso-propylamino-4-, 5- or 8-[3'- or 4'-(β:γ-dihydroxypropoxy)anilino]anthraquinone,
1-n-butylamino-4-, 5- or 8-[3'- or 4'-(γ-hydroxypropoxy)anilino]anthraquinone,
1-[2'-methyl-4'- or 5'-(β-hydroxyethylsulphamyl)anilino]anthraquinone,
1-[2':3':5':6'-tetramethyl-4'-(γ-hydroxypropylsulphamyl)anilino]anthraquinone,
1-amino-4-, 5- or 8-[3'- or 4'-(γ-hydroxypropoxycarbonyl)anilino]anthraquinone,
1-methylamino-4-, 5- or 8-[3'- or 4'-(β-hydroxyethoxycarbonyl)anilino]anthraquinone,
1-amino-4-, 5- or 8-[3'- or 4'-(β-{β'-hydroxyethyl}ethoxycarbonyl)anilino]anthraquinone,
1-amino-2-(chloro or bromo)-4-(β-hydroxypropylamino)anthraquinone, and
1-methylamino-2-(chloro or bromo)-4-(γ-hydroxypropylamino)anthraquinone.

One preferred class of the water-insoluble anthraquinone dyestuffs of the invention are the water-insoluble anthraquinone dyestuffs of the formula:

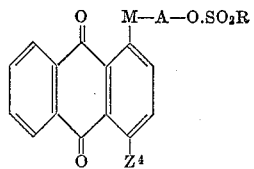

wherein A, M and R have the meanings stated, and $Z^4$ is selected from the class consisting of hydrogen, amino, hydroxy, lower alkylamino, cyclohexylamino and phenylamino, and any substituents on said phenyl radical are selected from the class consisting of lower alkyl and lower alkoxy. $Z^4$ is preferably selected from the class consisting of hydrogen, amino, lower alkylamino and cyclohexylamino.

A second preferred class of the anthraquinone dyestuffs of the invention are the dyestuffs wherein M represents the —NH— group.

A third preferred class of the anthraquinone dyestuffs of the invention are the dyestuffs wherein M represents the

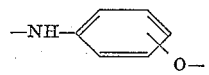

group, the oxygen atom preferably being attached to the benzene ring in m- or p-position to the —NH— group.

A fourth preferred class of the anthraquinone dyestuffs of the invention are the dyestuffs wherein M represents the

group, wherein B' has the meaning stated.

A fifth preferred class of the anthraquinone dyestuffs of the invention are the dyestuffs wherein R represents the methyl radical.

The water-insoluble anthraquinone dyestuffs of the invention are valuable for colouring artificial textile materials, in particular textile materials comprising polyamide fibres or modified polyacrylonitrile fibres. The said dyestuffs can be applied to textile materials by dyeing or printing processes; and the dyestuffs are preferably used in the form of aqueous dispersions which can be obtained by milling the dyestuffs with water preferably in the presence of one or more dispersing agents, such as non-ionic surface active agents, cationic surface-active agents or anionic surface-active agents. If desired the so-obtained aqueous dispersions of the dyestuffs can be dried to form redispersible powders.

The water-insoluble anthraquinone dyestuffs of the invention have excellent affinity for artificial textile materials, and the resulting colourations, which can be obtained in deep shades, have excellent fastness to light and to wet treatments which are commonly applied to artificial textile materials. The said textile materials are also coloured in level, or uniform shades; and this is particularly important in the case of polyamide textile materials which are prepared from polyamides of differing chemical and/or physical properties, and which are commonly referred to as barré nylon.

The invention is illustrated but not limited by the following examples in which the parts and percentages are by weight.

*Example 1*

A mixture of 5.1 parts of 1-isopropylamino-4-(γ-hydroxypropylamino)anthraquinone, 2.25 parts of methane sulphonyl chloride and 75 parts of pyridine is stirred at a temperature between 0° and 5° C. for 3 hours. 750 parts of water are then added and the precipitated dyestuff is filtered off, washed with water and dried. When dispersed in aqueous medium the dyestuff, which consists of 1-isopropylamino - 4 - (γ - methanesulphonyloxypropylamino) anthraquinone, dyes polyamide textile materials in blue shades possessing excellent fastness to washing and to light.

The 1-isopropylamino-4-(γ-hydroxypropylamino)anthraquinone used in the above Example may be obtained as follows.

A mixture of 20 parts of 4-bromo-1-isopropylaminoanthraquinone, 15 parts of 1:3-propanolamine, 5 parts of potassium acetate, and 60 parts of nitrobenzene is stirred at a temperature of 95° C. for 20 hours. The nitrobenzene is then removed by distilling with steam and the solid which is precipitated is filtered off, washed with water and dried.

*Example 2*

In place of the 5.1 parts of 1-isopropylamino-4-(γ-hydroxypropylamino)anthraquinone used in Example 1 there are used 6 parts of 1-methylamino-4-[4'-(β-hydroxyethoxy)anilino]anthraquinone. On analysis, the dyestuff so obtained, which melts at 118° C., and which consists of 1-methylamino-4-[4'-(β-methanesulphonyloxyethoxy)anilino]anthraquinone, is found to contain 6.1% of sulphur ($C_{24}H_{22}O_6N_2S$ requires 6.85% of sulphur). When dispersed in aqueous medium the dyestuff dyes polyamide textile materials in greenish-blue shades possessing excellent fastness to washing and to light.

The 1-methylamino-4-[4'-(β-hydroxyethoxy)anilino]anthraquinone used in the above Example may be obtained as follows:

A mixture of 15 parts of 4-bromo-1-methylaminoanthraquinone, 15 parts of 4-(β-hydroxyethoxy)aniline, 7.5 parts of potassium acetate, 0.2 part of cupric acetate and 70 parts of β-ethoxyethanol is stirred and heated at a temperature between 115° and 120° C. for 18 hours. The mixture is cooled to 20° C. and the crystalline precipitate of 1-methylamino-4-[4'-(β-hydroxyethoxy)anilino]anthraquinone is filtered off, washed with ethanol and dried. The product crystallises from benzene in the form of dark-blue prisms which melt at 152° to 156° C.

Example 3

In place of the 5.1 parts of 1-isopropylamino-4-(γ-hydroxypropylamino)anthraquinone used in Example 1 there are used 7.25 parts of 1-methylamino-4-[2'-(β-hydroxyethylsulphamyl) - 4'-toluidino]anthraquinone. The dyestuff so obtained, which consists of 1-methylamino-4-[2' - (β - methanesulphonyloxyethylsulphamyl) - 4'-toluidino]anthraquinone, when dispersed in aqueous medium, dyes polyamide textile materials in greenish-blue shades possessing excellent fastness to washing and to light.

The 1-methylamino-4-[2'-(β-hydroxyethylsulphamyl) 4'-toluidino]anthraquinone used in the above example may be obtained as follows:

A mixture of 50 parts of 1-methylamino-4-(4'-toluidino)anthraquinone and 300 parts of chlorosulphonic acid is stirred at a temperature of between 40° and 45° C. for 4 hours. The mixture is then poured onto 1500 parts of ice and the precipitated solid is filtered off and washed with water. The wet filter cake so obtained is stirred with 800 parts of acetone and 100 parts of monoethanolamine for 20 hours. 3000 parts of water and 100 parts of acetic acid are then added and the crystalline precipitate is filtered off, washed with water and dried.

Example 4

In place of the 5.1 parts of 1-isopropylamino-4-(γ-hydroxypropylamino)anthraquinone used in Example 1 there are used 6.0 parts of 1-methylamino-4-[4'-(β:γ-dihydroxypropoxy)anilino]anthraquinone. The dyestuff so obtained, when dispersed in aqueous medium, dyes polyamide textile materials in bright greenish-blue shades possessing excellent fastness to washing and to light.

The 1-methylamino-4-[4'-(β:γ-dihydroxypropoxy)anilino]anthraquinone used in the above example may be obtained as follows:

A mixture of 60 parts of 4-bromo-1-methylaminoanthraquinone, 80 parts of 4-(β:γ-hydroxypropoxy)aniline, 220 parts of β-ethoxyethanol, 30 parts of potassium acetate and 1 part of copper acetate is stirred at a temperature of 115° for 20 hours. The mixture is cooled to 20° C. and the product which crystallises out is filtered off, washed with ethanol, then with water and dried.

The following table gives further examples of the anthraquinone dyestuffs of the invention which are obtained when the 5.1 parts of 1-isopropylamino-4-(γ-hydroxypropylamino)anthraquinone used in Example 1 are replaced by equivalent amounts of the anthraquinone compounds listed in the second column of the table, and/or the 2.25 parts of methane sulphonyl chloride used in Example 1 are replaced by equivalent amounts of the acid chlorides listed in the third column of the table. The resulting dyestuffs, which are the lower alkane sulphonyl esters of the said anthraquinone compounds, when dispersed in aqueous medium dye polyamide textile materials in the shades listed in the fourth column of the table.

| Example | Anthraquinone compound | Acid chloride | Shade |
|---|---|---|---|
| 5 | 1-(β-hydroxyethylamino)anthraquinone | Methane sulphonyl chloride | Red. |
| 6 | 1-(γ-hydroxypropylamino)anthraquinone | do | Do. |
| 7 | 1-(β:γ-dihydroxypropylamino)anthraquinone | do | Do. |
| 8 | 1-[4'-(β-hydroxyethoxy)anilino]anthraquinone | Ethane sulphonyl chloride | Do. |
| 9 | 1-[2'-methyl-4'-(β-hydroxyethylsulphamyl)-anilino]anthraquinone | do | Do. |
| 10 | 1-[2':3':5':6'-tetramethyl-4'-(β-hydroxyethylsulphamyl)-anilino]anthraquinone | do | Do. |
| 11 | 1-hydroxy-4-(β-hydroxyethylamino)anthraquinone | do | Violet. |
| 12 | 1-amino-4-(γ-hydroxypropylamino)anthraquinone | Methane sulphonyl chloride | Reddish-blue. |
| 13 | 1-amino-4-[3'-(β-hydroxyethylsulphamyl)anilino]-anthraquinone | do | Do. |
| 14 | 1-amino-4-[2':4':6'-trimethyl-3'-(β-hydroxyethylsulphamyl)anilino]anthraquinone | Ethane sulphonyl chloride | Do. |
| 15 | 1-amino-4-[3'-(β-(β'-hydroxyethoxy)ethoxycarbonyl)-anilino]anthraquinone | Methane sulphonyl chloride | Blue. |
| 16 | 1-amino-4-(3'-(γ-hydroxypropoxycarbonyl)anilino]-anthraquinone | do | Do. |
| 17 | 1-methylamino-4-(-βhydroxyethylamino)anthraquinone | do | Do. |
| 18 | 1-methylamino-4-(γ-hydroxypropylamino)anthraquinone | do | Do. |
| 19 | 1-methylamino-4-[β-(β'-hydroxyethoxy)ethylamino]-anthraquinone | do | Reddish-blue. |
| 20 | 1-methylamino-4-(γ-(β'-hydroxyethoxy)propylamino]-anthraquinone | do | Blue |
| 21 | 1-methylamino-4-[4'-(α-hydroxypropoxy)anilino]anthraquinone | do | Greenish-blue. |
| 22 | 1-methylamino-4-[3'-(β:γ-dihydroxypropoxy)anilino]-anthraquinone | do | Do. |
| 23 | 1-methylamino-4-[2'-methyl-4¹-(β-hydroxyethylsulphamyl)-anilino]anthraquinone | do | Do. |
| 24 | 1-methylamino-4-[2':4'-dimethyl-6'(β-hydroxyethylsulphamyl)anilino]-anthraquinone | do | Blue |
| 25 | 1-ethylamino-4-(β-hydroxyethylamino)anthraquinone | do | Do. |
| 26 | 1-ethylamino-4-(γ-hydroxypropylamino)anthraquinone | do | Do. |
| 27 | 1-n-propylamino-4-(β-hydroxyethylamino)anthraquinone | do | Do. |
| 28 | 1-n-(propylamino)anthraquinone | do | Do. |
| 29 | 1-iso-propylamino-4-(β-hydroxyethylamino)anthraquinone | do | Do. |
| 30 | 1-iso-propylamino-4-[γ-(β'-hydroxyethoxy)propylamino]-anthraquinone | do | Do. |
| 31 | 1-iso-propylamino-4-[4'-(β-hydroxyethoxy)anilino]-anthraquinone | do | Greenish-blue |
| 32 | 1-iso-propylamino-4-[4'-(β:γ-dihydroxypropoxy)anilino]-anthraquinone | do | Do. |
| 33 | 1-iso-propylamino-4-[3'-(β:γ-dihydroxypropoxy)anilino]-anthraquinone | do | Do. |
| 34 | 1-n-butylamino-4-[4'-(β-hydroxyethoxy)anilino]anthraquinone | n-Propyl sulphonyl chloride | Greenish-blue. |
| 35 | 1-n-butylamino-4-[4'-(β:γ-dihydroxypropoxy)anilino]-anthraquinone | Methane sulphonyl chloride | Do. |
| 36 | 1-cyclo-hexylamino-4-(γ-hydroxypropylamino)anthraquinone | do | Blue. |
| 37 | 1-cyclo-hexylamino-4-[γ-(β'-hydroxyethoxy)propylamino]-anthraquinone | do | Do. |
| 38 | 1-anilino-4-(γ-hydroxypropylamino)anthraquinone | do | Greenish-blue. |
| 39 | 1-anilino-4-[γ-(β'-hydroxyethoxy)propylamino]anthraquinone | do | Blue. |
| 40 | 1-(2'-methylanilino)-4-(β:γ-dihydroxypropylamino)anthraquinone | Ethane sulphonyl chloride | Do. |
| 41 | 1-(4'-methoxyanilino)-4-(β:γ-dihydroxypropoxy)-anthraquinone | do | Do. |
| 42 | 1-amino-5-(β-hydroxyethylamino)anthraquinone | Methane sulphonyl chloride | Red. |
| 43 | 1-amino-5-[4'-(β-hydroxyethoxy)anilino]anthraquinone | do | Magenta. |
| 44 | 1-methylamino-5-(β-hydroxyethylamino)anthraquinone | do | Red. |
| 45 | 1-methylamino-8-(β-hydroxyethylamino)anthraquinone | do | Do. |
| 46 | 1-amino-2-bromo-4-[2'-(β-hydroxyethoxycarbonyl)anilino]-anthraquinone | Ethane sulphonyl chloride | Blue. |
| 47 | 1-amino-2-bromo-4-(γ-hydroxypropylamino)-6-chloro-anthraquinone | Methane sulphonyl chloride | Reddish-blue. |

What we claim is:
1. The water-insoluble anthraquinone dyestuffs of the formula:

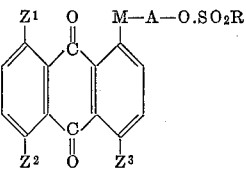

wherein
R represents a lower alkyl radical;
A represents a divalent radical selected from the class consisting of ethylene, trimethylene and β-hydroxytrimethylene radicals;

M represents a divalent linking group selected from the class consisting of —NH—, —NHCH$_2$CH$_2$O—, —NHCH$_2$CH$_2$CH$_2$O—,

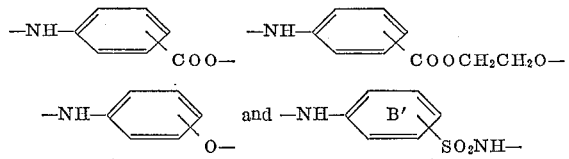

and any substituents on the benzene ring B' are methyl groups;

two of $Z^1$, $Z^2$ and $Z^3$ represent hydrogen atoms and the third of $Z^1$, $Z^2$ and $Z^3$ is selected from the class consisting of hydrogen, amino, hydroxy, lower alkylamino, cyclohexylamino and phenylamino, and any substituents on said phenyl radical are selected from the class consisting of lower alkyl and lower alkoxy;

and any further substituents on the anthraquinone nucleus are selected from the class consisting of chlorine and bromine atoms.

2. A water-insoluble anthraquinone dyestuff of the formula:

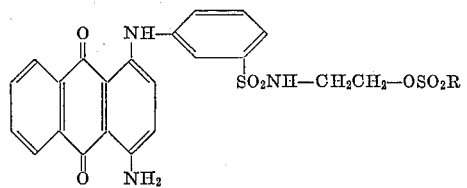

wherein R represents lower alkyl.

3. The anthraquinone dyestuff of the formula:

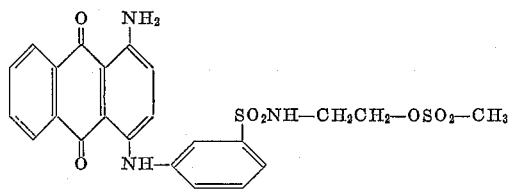

4. A water-insoluble anthraquinone dyestuff of the formula:

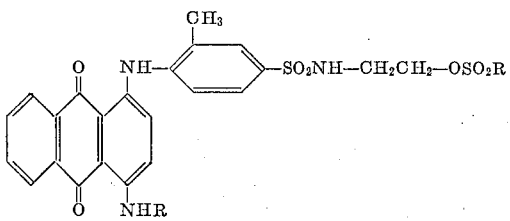

wherein R is lower alkyl.

5. The anthraquinone dyestuff of the formula:

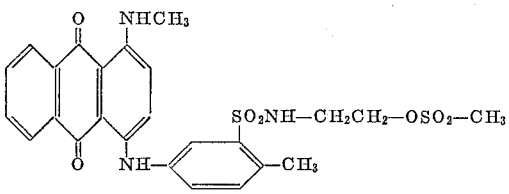

6. The anthraquinone dyestuff of the formula:

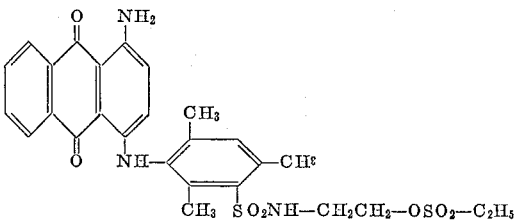

References Cited by the Examiner

UNITED STATES PATENTS

| | | | |
|---|---|---|---|
| 2,730,534 | 1/56 | Hoefle et al. | 260—371 X |
| 2,773,863 | 12/56 | Bolliger | 260—155 X |
| 2,784,204 | 3/57 | Heyna et al. | 260—374 X |
| 3,102,894 | 9/63 | Lodge | 260—374 |

OTHER REFERENCES

Bolliger (German), Kl 22a, 1,002,099, February 7, 1957.

LORRAINE A. WEINBERGER, *Primary Examiner.*
LEON ZITVER, *Examiner.*